United States Patent [19]

Yamazaki et al.

[11] 3,936,151
[45] Feb. 3, 1976

[54] CORRECTION LENSES UTILIZED TO FORM FLUORESCENT SCREENS OF COLOUR PICTURE TUBES

[75] Inventors: Eiichi Yamazaki, Ichihara; Toshio Ueda; Koichi Maruyama, both of Mobara; Iwao Ogura, Tokyo, all of Japan

[73] Assignee: Hitachi, Ltd., Tokyo, Japan

[22] Filed: Dec. 4, 1973

[21] Appl. No.: 421,740

[30] Foreign Application Priority Data
Dec. 4, 1972 Japan............................ 47-120649

[52] U.S. Cl.................. 350/189; 350/175 R; 354/1
[51] Int. Cl.²..................... G02B 3/04; G03B 27/00
[58] Field of Search......... 350/189, 175 R, 204, 205; 354/1

[56] References Cited
UNITED STATES PATENTS

| 3,628,850 | 12/1971 | Yamazaki et al............ | 350/189 |
| 3,811,754 | 5/1974 | Morrell et al................ | 350/189 |
| 3,828,358 | 8/1974 | Miyaoka...................... | 354/1 |

Primary Examiner—R. V. Rolinec
Assistant Examiner—Ernest F. Karlsen
Attorney, Agent, or Firm—Charles E. Pfund, Esq.

[57] ABSTRACT

In a correction lens wherein the effective surface thereof has at least a lens member having no island shaped portion, said member being defined by the step shaped border line never closing by themselves to form an island shaped lens segment on said correction lens surface.

7 Claims, 17 Drawing Figures

CORRECTION LENSES UTILIZED TO FORM FLUORESCENT SCREENS OF COLOUR PICTURE TUBES

BACKGROUND OF THE INVENTION

This invention relates to an improved correction lens adapted to form three colour phosphor elements of a fluorescent screen of a colour picture tube.

To form such phosphor elements, it is usual to use an exposure device generally termed a "lighthouse", consisting essentially of a light source, a member for supporting the face plate of a colour picture tube having a fluorescent screen and including a colour selection electrode, and a correction lens interposed between the light source and the face plate for causing the path of the exposure light emanated from the light source to approximate the electron beam in the colour picture tube during normal operation thereof. The electron beam lines during operation of the picture tube is greatly influenced by external magnetic fields including the terrestrial magnetism so that in order to have the path of the exposure light closely approximated the electron beam the optical surface of the correction lens should be constructed to have an extremely sophisticated configuration. This is caused by the fact that the aberration between the phosphor element and the electron beam spot varies greatly, that is the direction and magnitude of the aberration vary at random. For this reason, in order to correct such an aberration that vary from point to point it has been the practice to design the correction lens to divide it into numerous small lens segments and to establish a desired light path for each segment. In one design, the effective surface was devided in the form of a grid, whereas, according to another design the effective area was divided in the radial direction as disclosed in U.S. Pat. No. 3,279,340. In each design the design of the light path was made independently for each divided lens segment. Although such measures have succeeded to some extent to mate the path of the exposure light and that of the electron beam, design and manufacture of such correction lenses require a long duration and a large expense. Moreover, the correction lenses manufactured by these methods introduced serious problems. More particularly, as described hereinabove, since the design for each lens segment must be made independently it is inevitable that adjacent lens segment adjoin with a step shaped border lines therebetween. In other words, the number of step shaped border lines increases when the number of the divided lens segment is increased for the purpose of attaining more approximated path of the exposure light to the electron beam. Since each of surfaces surrounded with the step shaped border line shows different optical property for the projected light from that of the effective surface of the correction lens, uniform exposure of the fluorescent screen is impossible, thus forming a shadow. In this manner, a new problem of eliminating the shadow has arisen. The size of the phosphor element on the fluorescent screen is related directly to the energy of the exposure light and the size of the phosphor element is small at the shadow. Unless this problem is solved, it is impossible to uniformly form the phosphor elements. For the purpose of eliminating the shadow a number of proposals have been made including a method of vibrating the correction lens in a plurality of directions, a method of more finely dividing the elemental areas, a method of utilizing a dummy lattice (U.S. patent application Ser. No. 231,313, now U.S. Pat. No. 3,788,200, British Pat. No. 10114/72 and German Pat. No. P 22 10 725.1), a method of using a filter (U.S. patent application Ser. No. 231,219, now U.S. Pat. No. 3,809,558 British Pat. No. 10116/72, German Pat. No. P 22 10 724.0, and French Pat. No. 72 07519) and a method of utilizing a plurality of correction lenses, whose step shaped border lines are coated with an opaque substance, for performing a plurality of light exposure (U.S. Pat. No. 3,279,340). However, any one of these prior solutions added large cost to the sophisticated design and manufacturing of the correction lens described above. For example, the method of vibrating the correction lens requires to add means for vibrating the correction lens and means for controlling the vibration which of course increases the cost of installation and manufacturing. The other methods have similar disadvantages.

SUMMARY OF THE INVENTION

Accordingly, it is an object of this invention to provide an improved correction lens which can be manufactured readily with low cost and is used to form phosphor elements on a fluorescent screen of a colour picture tube which can reproduce pictures of high qualities.

Another object of this invention is to provide an improved correction lens that can decrease shadow on the fluorescent screen.

According to this invention, the number and the length of the step shaped border lines formed by the adjacent effective lens segments can be decreased by the way of repeating adjustment on the step height between lens segments and the inclination of the effective lens surfaces for the entire surface of the correction lens. Thus shadows due to the step shaped border line are effectively eliminated on the phosphor screen and the number of molds being used for manufacturing correction lens can be decreased to one tenth or one hundredth comparing to the conventional prior art.

BRIEF DESCRIPTION OF THE DRAWINGS

Further objects and advantages of the invention will be more clearly understood from the following detailed descriptions taken in conjunction with the accompanying drawings in which.

DESCRIPTION OF THE PREFERRED EMBODIMENTS

Figure 1:
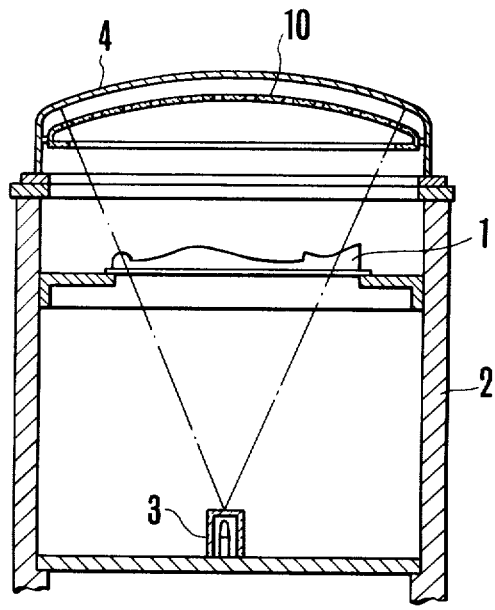
FIG. 1 is a schematic sectional view of a typical exposure device.

An exposure device as shown in FIG. 1 typically comprises a correction lens 1, a support 2, a light source at the bottom of the support and a face plate 4 supported by the the support and including a fluorescent screen, not shown, coated on the inner surface of the face plate and a colour selection electrode in the form of a shadow mask 10, for example.

Figure 2:
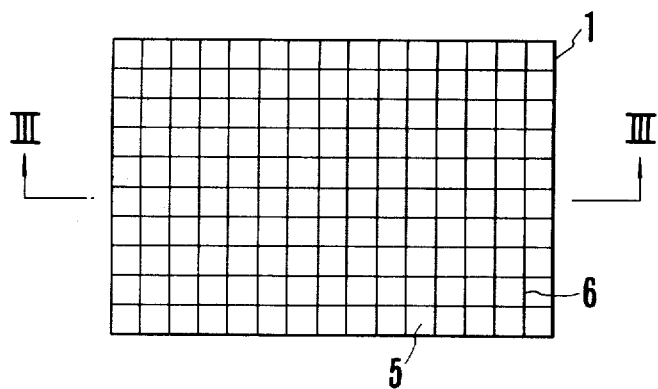
FIG. 2 is a plan view showing a conventional lattice type correction lens.
Figure 3:
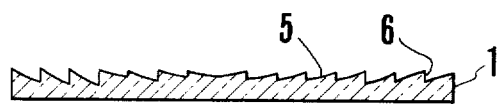
FIG. 3 is a sectional view of the correction lens shown in FIG. 2 taken along a line III — III.
Figure 4:
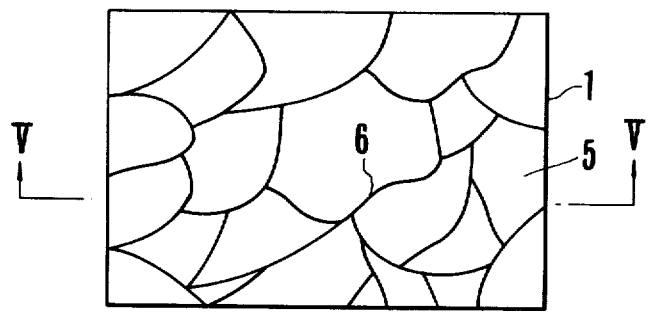
FIG. 4 is a plan view showing a conventional correction lens whose entire effective area is divided arbitrary.
Figure 5:
FIG. 5 is a sectional view of the correction lens shown in FIG. 4 taken along line V — V.

As described hereinabove, in a correction lens having a curved surface since it has been impossible to have the path of the exposure light held a fairly good approximation to the electron beam of a colour picture tube in operation thereof, a correction lens having a plurality of divided lens segments, as shown in FIGS. 2 and 3, has been used. The correction lens 1 shown in FIGS. 2 and 3 is provided with a plurality of step shaped border lines 6 which divide the effective surface of the lens into a plurality of small curved or plain segment surfaces 5 which are polished with an optical accuracy. To form such a correction lens having step shaped surfaces as shown in FIG. 2, it is necessary to use several hundreds of metal molds respectively provided with optically finished accurate surfaces which requires a large labour and cost for manufacturing.

However, among these many lens segments the radius of curvature and inclination of the surfaces of some of adjacent lens segment can be made equal thus enabling to integrate these segment into a single block by taking into consideration the effect of the thickness. Said consideration on the effect of the thickness means that the inclination of the effective lens segment surface is adjusted in relation to the variation of said lens segment thickness which is taken place in the adjustment of the step height of said step shaped border line so as to keep the light path effectively unchanged before and after varying the thickness of the lens segment and to reduce the number and the length of said border line. More particularly, it is possible, not only theoretically but also practically, to obtain the relative position of such a block where the step shaped border line becomes stepless or step shaped at least at one point without changing lens effect by adjusting the relative positions of the blocks at different levels and the inclination of the block surface. By repeating this process it is possible to cover the entire surface of the correction lens with a continuous curved or plain surface comprising a plurality of adjoining lens member at the same level or having step shaped or stepless border lines. For this reason, it is possible to form the step shaped border surfaces at portions alone which require them, that is at the particular portions of the correction lens where it is extremely difficult to cause the exposure light to closely approximate the electron beam.

Being apparent from embodiments set forth below, the correction lens designed and manufactured by this invention has only a few step shaped border lines which are actually not so influential for the shadow on the phosphor screen so that the number of metal molds, the process and the expense required for the lens manufacturing can be reduced to great extent. Even if some of the step shaped border lines make shadows, only a more simplified procedure than previously used will be required for eliminating said shadow compared to the prior art.

Figure 6:
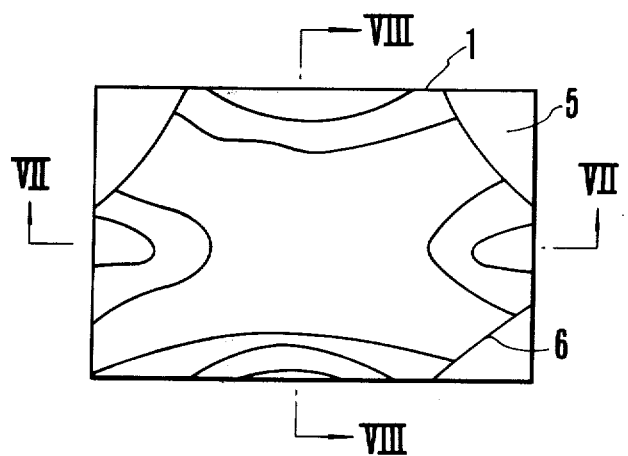
FIG. 6 is a plan view of the novel correction lens of this invention in which the step shaped border lines are provided only at the peripheral portions of the lens.
Figure 7:
FIG. 7 is a sectional view of the correction lens shown in FIG. 6 taken along a line VII — VII.
Figure 8:
FIG. 8 is a sectional view of the correction lens shown in FIG. 6 taken along a line VIII — VIII.

FIG. 6 shows one embodiment of this invention wherein the correction lens 1 is provided with a plurality of surfaces having step shaped border lines. It will be noted that curved or plain surface bounded by the step shaped border line 6 contains at least a portion of the effective surface of the lens as a part of the lens member. With this construction, the side edges of the correction lens are also utilized as the function of the step shaped border lines thus decreasing the number and the length of the border line 6. As can be noted from FIGS. 7 and 8, the central portion of the lens comprises a continuous curved surface 8 or a surface including a stepless border line 7.

FIGS. 9 through 17 show possibly considerable embodiments of this invention corresponding to various cases of correction lenses. These varied patterns of lens correction are caused by the fact that the magnitude and direction of the aberration between phosphor element and electron beams are entirely arbitrary on the face plate mainly due to external magnetic fields including the terrestrial magnetism.

Figure 9:
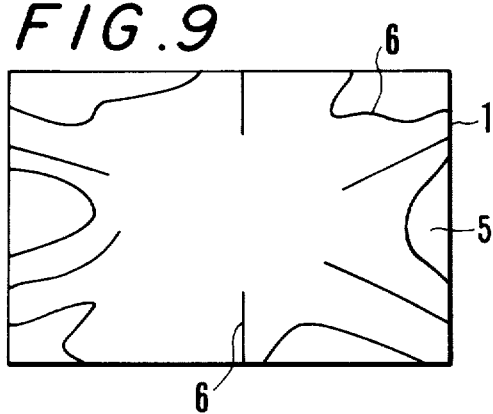
FIG. 9 is a plan view of another novel correction lens of this invention.
Figure 10:
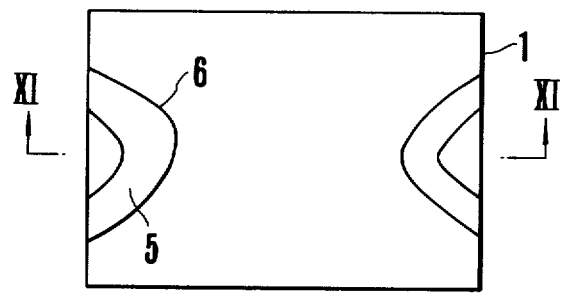
FIG. 10 is a plan view of still another novel correction lens of this invention by which the correction is made only at right and left portion of the lens.
Figure 11:
FIG. 11 is a sectional view of the correction lens shown in FIG. 10 taken along a line XI — XI.
Figure 12:
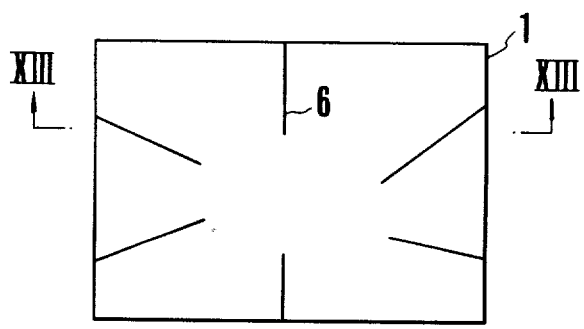
FIG. 12 is a plan view of further novel correction lens of this invention in which step shaped border lines are straight and terminated within the central effective surface of the lens.
Figure 13:
FIG. 13 is a sectional view of the correction lens shown in FIG. 12 taken along a line XII — XII.
Figure 14:
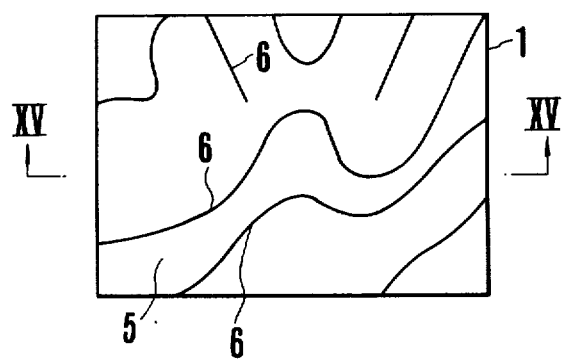
FIG. 14 is a plan view of still further novel correction lens of this invention.
Figure 15:
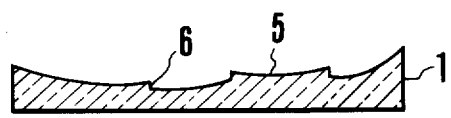
FIG. 15 is a sectional view of the correction lens shown in FIG. 14 taken along a line XV — XV.
Figure 16:
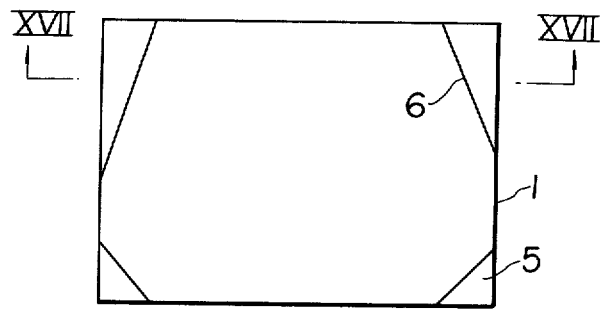
FIG. 16 is a plan view of still further novel correction lens of this invention by which the correction is made at four corners of the lens.
Figure 17:
FIG. 17 is a sectional view of the correction lens shown in FIG. 16 taken along a line XVII — XVII.

FIG. 10 shows an example of correction whereby the aberration occured at right and left side of the phosphor screen will be corrected to approximate the light path to the electron beam. FIG. 16 shows an example of correction whereby the aberration at four corners of the phosphor screen will be corrected. FIG. 12 shows another pattern of the correction lens surface wherein step shaped border lines are originated from the peripheries of the lens and terminated in the central portion of the lens. In FIGS. 9 and 17, possibly considerable configurations of the correction lenses are shown in general sense.

In any embodiments by this invention, the correction lens has no island shaped portion on its effective surface. That is to say, any step shaped border lines never close by itself. Accordingly the number and the length of the step shaped border lines can be decreased, thus contributing to reduce shadows caused by the step shaped border lines. Consequently the number of lens segment can be reduced so that the number of metal molds for manufacturing the correction lens will be greatly decreased.

As has been described, the invention provides an improved correction lens in which the number and the length of the step shaped border lines have been greatly decreased thus decreasing the shadow, and the cost of manufacturing.

What is claimed is:

1. A correction lens for photographically forming phosphor elements on the inner surface of a panel of a color picture tube to cause the light path to approximate the impingement point on said inner surface for electron beams emanated from electron guns disposed in the neck portion of the colour picture tube, said correction lens being comprised of a plurality of lens blocks formed at least on one side with an effective surface thereon, said blocks each having a particular refractive characteristic determined in accordance with a portion of a fluorescent screen to be made up of said elements said correction lens having at least some step-shaped border lines formed in different configurations and sizes between said blocks, any such step-shaped border line not being closed upon itself and without terminating in a point common to all said step-shaped border lines, at least some of said effective surfaces lying between said step-shaped border lines but not completely bounded thereby whereby the number of blocks comprising said correction lens is reduced.

2. The correction lens according to claim 1, wherein said step-shaped border line extends from edge to edge of said effective surface.

3. The correction lens according to claim 1, wherein said block comprises a flat surface.

4. The correction lens according to claim 1, wherein said block comprises a curved surface.

5. The correction lens according to claim 1, wherein at least one of said blocks partially terminates in an adjacent block with a continuous effective surface.

6. In a correction lens utilized to form phosphor elements on a fluorescent screen and to cause the light path to approximate electron beams emanated from electron guns disposed in the neck of the colour picture tube, said correction lens being comprised of a plurality of divided effective lens segments formed on at least one side effective surface thereof, said segment having a predetermined curved or flat surface which is defined by a border line, the improvement wherein said correction lens is formed through the steps of adjusting the surface inclination and thickness of said segments to form blocks one of which partially terminates in another block with a continuous effective surface and repeating said adjusting step, to obtain each step-shaped border line not closed upon itself in the effective surface of the correction lens and with said step-shaped border lines formed in different configurations and sizes without a common point whereby the number of blocks comprising said correction lens is reduced.

7. The correction lens according to claim 6, wherein the optical function of said lens is kept effectively unchanged before and after said adjusting step.

* * * * *